United States Patent [19]

Suzuki et al.

[11] Patent Number: 5,254,425
[45] Date of Patent: Oct. 19, 1993

[54] SELF-DISPERSING COLORANT, LIQUID DEVELOPING AGENT FOR ELECTROSTATIC PHOTOGRAPHY, TONER SUPPLY AND TONER KIT

[75] Inventors: Nobuo Suzuki; Yutaka Sakasai; Hiromichi Tachikawa, all of Kanagawa, Japan

[73] Assignee: Fuji Photo Film Co., Ltd., Kanagawa, Japan

[21] Appl. No.: 615,948

[22] Filed: Nov. 20, 1990

[30] Foreign Application Priority Data

Nov. 20, 1989 [JP] Japan .................................. 1-301079

[51] Int. Cl.$^5$ .............................................. G03G 9/13
[52] U.S. Cl. ....................................... 430/115; 430/137
[58] Field of Search ..................... 430/114, 115, 137

[56] References Cited

U.S. PATENT DOCUMENTS 5,035,971  7/1991  Kato et al. ............................ 430/114
5,055,370 10/1991  Suzuki et al. ......................... 430/114

*Primary Examiner*—John Goodrow
*Attorney, Agent, or Firm*—Sughrue, Mion, Zinn, Macpeak & Seas

[57] ABSTRACT

A self-dispersing graft-copolymer capable of self-dispersion in a high-electrical insulating carrier liquid to form grains therein. The graft-copolymer is combined with a pigment or dye to provide a self-dispersing solid colorant, which is suitable as a toner or toner supply for a liquid developing agent for electrostatic photography. The colorant is also applicable to a printing ink, an ink for an ink-jet system or a coating paint composition. The colorant well self-disperses in a carrier liquid to form well dispersed grains therein without the necessity of mechanical dispersing means.

12 Claims, No Drawings

SELF-DISPERSING COLORANT, LIQUID DEVELOPING AGENT FOR ELECTROSTATIC PHOTOGRAPHY, TONER SUPPLY AND TONER KIT

FIELD OF THE INVENTION

The present invention relates to a colorant which is composed of a resin and a pigment or dye and which is used in preparing a liquid developing agent for electrostatic photography, a printing ink, an ink for an ink-jet system and a coating paint composition, as well as to use of the colorant as a component in a liquid developing agent, a toner supply and a toner kit for electrostatic photography.

BACKGROUND OF THE INVENTION

As a colorant and a toner to be in a liquid developing agent for electrostatic photography, a printing ink, an ink for an ink-jet system and a coating paint composition, a pigment or dye or a colorant prepared by coating a pigment or dye with a fixing resin should be dispersed in a carrier liquid in a stable manner. Additionally, a printed product, a coated product or an image obtained by the use of the developing agent, ink or coating paint composition should also have a high coloration degree and a high image density and should additionally provide a sharp image. In particular, in a liquid developing agent for electrostatic photography, since the image-forming forming grains of a so-called toner, which are dispersed in a highly-insulating non-aqueous solvent, greatly influence the quality of the image developed with the agent, toner grains in particular should have good dispersibility.

Two methods—a dry developing method and a liquid developing method—in general are approaches used forming a visual image from an electrostatic latent image as formed in an electrostatic photographic process. The liquid developing method is superior to the dry developing method, since minute toner grains can be used and fine images or halftone images can be faithfully reproduced.

In general, a liquid developing agent for electrostatic photography comprises a colorant such as various pigments or dyes, with carbon black being a typical example, a coating agent which adsorbs onto or coats the colorant for adjusting the charge of the colorant or for imparting a fixing property to the colorant, a dispersing agent for dispersing the toner grains, a charge-adjusting agent to adjust the polarity and the amount of charge of the toner grains, and a highly electrically-insulating non-aqueous solvent carrier liquid having a dielectric constant of 3 or less and a volume resistivity of $10^9$ $\Omega$cm or more. The agent does not need to contain a pigment or dye, when it is applied to a printing plate where the toner image should have only an ink-adhering property, when it is used in preparing a printing plate using an etching liquid, the agent also does not need to contain a pigment or dye and only needs to have resist properties. A liquid developing agent, a printing ink and a coating paint composition are generally prepared using the following method. More specifically, a pigment or dye and a fixing resin, or a pigment or dye coated with a fixing resin is converted directly into a powder of the desired size or in a dry system. Thereafter it is dispersed in a dispersing agent-containing a high-electrical resistance non-aqueous solvent using a wet-dispersing machine such as a ball mill, a paint shaker or a sand mill, to obtain a thick dispersion. The thus prepared thick dispersion is used directly or after dilution with a solvent. In preparing a liquid developing agent, the thick dispersion is added to a charge-adjusting agent-containing carrier liquid to obtain a liquid developing agent having a positive or negative polarity.

Alternatively, a different method can be used in which monomers capable of forming a polymer which is insoluble in a carrier liquid are polymerized in the carrier liquid in the presence of a polymer which is soluble in the carrier liquid to form resin grains (dispersion polymerization), and the grains are dyed with a dye, or they are added to a charge-adjusting agent-containing carrier liquid along with a separately dispersed pigment to prepare a liquid developing agent, an ink or a coating paint composition. Accordingly, a mechanical dispersing means or a granulating means for dispersion polymerization or the like is necessary in order to prepare toner grains of a liquid developing agent, or an ink or a coating paint composition. Additionally, this is conducted in a carrier liquid, and the formed dispersion is stored before use in the carrier liquid or diluted with a dispersing liquid or carrier liquid. Accordingly, the dispersion being stored is influenced by the ambient temperature and humidity during transportation or storage before use. This results in a variation in the characteristics of the dispersion, such as grain size or viscosity thereof, as compared with the characteristics of the corresponding fresh dispersion immediately after preparation. As discussed above, in the case of a liquid developing agent, a charge-adjusting agent is added to the toner grains present in the liquid developing agent in order that the positive or negative polarity of the grains and the charged amount thereof are held constant. Additionally, the toner further contains a fixing resin for the purpose of providing fixing properties thereto, in addition to a pigment or dye. Therefore, the charge-adjusting agent and the fixing resin often separate from the pigment or dye (de-coating) as a result of variations in the ambient temperature and humidity conditions during transportation or storage or with the lapse of time on storage. This results in variations in the charged amount or a coagulation of the toner grains. As a result, the characteristics of the stored liquid developing agent vary which adversely influences the quality of the images formed with the agent.

In order to overcome the problems, for example, search for a more stable charge-adjusting agent, development of a better combination of pigment and coating agent resin, and search for a coating agent resin which scarcely undergoes de-coating are being conducted. In addition, investigation of better dispersing means and search for a better dispersing agent are also being conducted to overcome the time-dependent variation in the dispersing properties of the developing agent. However, since the above-mentioned phenomena are intrinsic problems in a liquid dispersion system it is difficult to completely solve these problems.

The best method of solving the problems is to prepare a liquid developing agent (toner) just before its use and the fresh agent is not stored but is used immediately. One example of a method is to add a toner for supply to a developing agent being used in depending on the amount of the toner used. However, since the toner supplied in this method is a high-density dispersion, the toner of itself varies with the lapse of time during storage thereof. Accordingly, this method can not be used to solve these problems.

JP-A-1-113766 (the term "JP-A" as used herein means an "unexamined published Japanese patent application") discloses a toner for supply which is in the form of a solid tablet. This is prepared by tableting toner grains with a binder resin which is soluble in a carrier liquid. In the illustrated method, a colorant or a flashed colorant and a resin are first dispersed in a liquid carrier with a dispersing agent to obtain a thick dispersion, and this is filtered by forced filtration, then dried and powdered with a mixer to obtain a powder. Next, the resulting powder is tableted with a binder which is soluble in the carrier liquid. Suitable binders which can be used are paraffin wax, higher fatty acids, higher alcohols and higher fatty acid esters. However, the method is extremely complicated, and the forced filtration of the thick dispersion is, in particular, not practical. Additionally, drying of the filtered dispersion residue induces re-coagulation of the toner grains, whereby a redispersion of the tableted toner is difficult.

JP-A-63-194270 illustrates a method where a high polymer substance having a melting point in the vicinity of room temperature is added to a commercial liquid developing agent to gel and solidify the liquid developing agent, and the solidified agent is heated to liquify it just before use. In this method, the agent may be either a solid or a liquid by repeatedly cooling and heating the same. The solid state as referred to therein means a gel state which contains a liquid component. Therefore, the developing agent gel becomes liquid when the ambient temperature rises. In practical use of this agent, this agent is often inconvenient to use since it becomes liquid as the ambient temperature rises even though it should be solid.

In view of the above, a solid self-dispersing colorant which is capable of dispersion by itself to form a stable dispersion only when it is added to a carrier liquid, as well as a liquid developing agent for electrostatic photography which contains such a colorant, and a toner for supply to a liquid developing agent and a toner kit also containing such a colorant have not been developed at present.

SUMMARY OF THE INVENTION

Thus, the present invention is developed toward a self-dispersing colorant which may be used to produce a stable dispersion only when it is added to a carrier liquid as well as a self-dispersing graft-copolymer to be used in preparing such a colorant.

Accordingly, a first object of the present invention is to provide a self-dispersing solid colorant capable of self-dispersion to provide a stable dispersion only when it is added to a carrier liquid.

A second object of the present invention is to provide a liquid developing agent for electrostatic photography, which is prepared from a self-dispersible resin substance and a colorant.

A third object of the present invention is to provide a solid toner for supply to a liquid developing agent for electrostatic photography.

A fourth object of the present invention is to provide a toner kit which is composed of a complete solid toner and a carrier liquid.

A fifth object of the present invention is to provide a liquid developing agent for electrostatic photography, which is free from the problems of time-dependent instability.

The present inventors have found that a self-dispersing graft-copolymer is obtained from a component insoluble in a carrier liquid and a component soluble in a carrier liquid and is preferably usable as a resin of a colorant or toner. In particular, the graft-copolymer preferably contains a monomer component where a graft moiety thereto is a macromonomer. Using the graft-copolymer, a self-dispersing colorant, a stably dispersed liquid developing agent, a toner supply and a toner kit have been obtain. Specifically, the above-mentioned objects of the present invention are attained by a self-dispersing solid colorant comprising a self-dispersing graft-copolymer capable of self-dispersion in a highly-electrically insulating carrier liquid to form grains and a pigment or dye.

One preferred embodiment of the present invention provides a self-dispersing graft-copolymer such that the monomer forming the graft moiety is a macromonomer having a polymerizable functional group at its terminal.

Another embodiment of the present invention provides a liquid developing agent for electrophotography which contains toner grains at least containing a resin, as dispersed in a high-electrically insulating carrier liquid and wherein the resin is a self-dispersing graft-copolymer capable of self-dispersion in the carrier liquid to form grains.

Still another embodiment of the present invention provides a self-dispersing graft-copolymer in the developing agent such that the monomer forming the graft moiety is a macromonomer having a polymerizable functional group at its terminal.

Still another embodiment of the present invention provides a solid toner for supply to a liquid developing agent for electrostatic photography, which contains toner grains at least containing a resin and dispersed in a high-insulating carrier liquid, where the toner supply is a self-dispersing graft-copolymer capable of self-dispersion in a high-insulating carrier liquid to form grains, or a self-dispersing solid colorant containing at least one of a pigment, a dye, a charge-adjusting agent and a dispersion stabilizer in the graft-copolymer.

Still another embodiment of the present invention is such that the graft-copolymer in the solid toner supply is produced from a monomer forming the graft moiety which is a macromonomer having a polymerizable functional group at its terminal.

Still another embodiment of the present invention provides a toner kit for a liquid developing agent for electrostatic photography, which is composed of a self-dispersing graft-copolymer capable of self-dispersion in a high-insulating carrier liquid to form grains or a self-dispersing solid colorant containing at least one of a pigment, a dye, a charge-adjusting agent and a dispersion stabilizer in the graft-copolymer, and a high-insulating carrier liquid or a high-insulating carrier liquid composition containing at least one of a charge-adjusting agent and a dispersion stabilizer.

In still another embodiment of the present invention, the graft-copolymer in the toner kit is such that the monomer forming the graft moiety is a macromonomer having a polymerizable functional group at the terminal of the monomer.

DETAILED DESCRIPTION OF THE INVENTION

The term "self-dispersibility" as used herein means that the colorant or resin in a solid form (for example, in the form of mass, tablet, granule or powder) spontaneously disperses in a carrier liquid without any means such as mechanical dispersion to form grains in the liquid. The "solid" form means that the substance is solid at room temperature and in any desired form such as a mass, tablet, granule or powder.

The term "toner supply" means a liquid developing agent for replenishment that is added to a liquid developing agent during or after use thereof so that the latter agent may again be used for further forming images. Specifically, the term "toner supply" as referred to herein means a solid dispersant precursor consisting essentially of an image-forming toner grain component. The term "toner kit" as used herein means a combination of a solid essentially forming toner grains and a liquid consisting essentially of a liquid carrier, where the blending of the two produces a liquid developing agent.

The term "macromonomer" as used herein means a polymer having a polymerizable functional group at the terminal of the molecule, as is described in *New Encyclopedia of High Polymers* (edited by Japan High Polymer Society, 1st Ed., issued in 1988, published by Asakura Publishing Co.). Examples of suitable functional groups are a double bond-containing vinyl group, a polymerizable double bond group, or an ethylenically unsaturated group or other polycondensable functional groups such as a carboxyl group, a hydroxyl group, an amino group, an epoxy group, an isocyanate group and an acid anhydride containing group.

Graft-copolymers of the present invention, which are produced by the use of such a macromonomer, have characteristics such that the structure is distinct and the amount of impurities therein is small, as so clarified in the above-mentioned *New Encyclopedia of High Polymers*.

The present invention is explained in greater detail hereunder.

A colorant which comprises a coloring agent and a fixing resin and which is in a liquid developing agent for electrostatic photography, a printing ink, an ink for ink-jet system or a coating paint composition should be finely dispersed in a carrier liquid and stably dispersed therein without coagulation or flocculation. For this purpose, a colorant composed of a coloring agent and a fixing resin can be dispersed using a mechanical dispersing means, for example, a ball mill, a three-roll mill, an attritor, a dynomill, a sand grinder or the like, to form fine grains using prior art technique. As opposed to this, the present invention provides a novel dispersion system which does not require a mechanical dispersing means or a granulating means by dispersion polymerization. Specifically, in accordance with the present invention, the colorant only needs to be added to a carrier liquid to form a stable dispersion system.

Examples of fixing resins present in conventional liquid developing agents for electrostatic photography are for example, various known resins which are insoluble or swellable in a carrier liquid.

For instance, examples include rubbers such as butadiene rubbers, styrene-butadiene rubbers, cyclized rubbers or natural rubbers; synthetic resins such as styrene resins, vinyltoluene resins, acrylic resins, methacrylic resins, polyester resins, polycarbonate resins or polyvinyl acetate resins; rosin resins; hydrogenated rosin resins; alkyd resins including modified alkyl resins such as linseed oil-modified alkyl resins; and natural resins such as polyterpenes. Additional examples are phenol resins including modified phenol resins such as phenol-formaldehyde resins, as well as natural resin-modified maleic acid resins, pentaerythritol phthalates, chromanindene resins, ester gum resins, and vegetable oil polyamides.

These resins are insoluble or swellable in a high-insulating non-aqueous solvent and do not spontaneously disperse to form grains. In contrast to this resins, it has been found that graft-copolymers of a certain kind, which are composed of a component insoluble in a carrier liquid and a component soluble in a carrier liquid, may spontaneously disperse in the carrier liquid to form grains therein as if they dissolve therein, simply by merely adding them to the carrier liquid. However, random copolymers which are composed of the same insoluble component and soluble component are either insoluble or swellable in a carrier liquid but they do not display a despersibility behavior. Though it is not clear at present why the graft-copolymers of the present invention display the behavior, it is presumed that the insoluble component in the graft-copolymer forms nuclei of the grains while the soluble component in the graft-copolymer is solvated with the carrier liquid to thereby maintain a stable dispersion of the grains in the carrier liquid.

The graft-copolymer of the present invention has been achieved by a copolymer obtained by copolymerization of macromonomers and copolymerizable comonomers. The copolymer thus prepared is a graft copolymer where the branches are derived from the macromonomers and the stem from the comonomers (macromonomer method).

In a general graft-copolymerization reaction where no macromonomer is present, a stem polymer which has a graft-copolymerizable graft-active point is first synthesized and it is then copolymerized with comonomers as branches. The above-mentioned macromonomer method is opposite to the general graft-copolymerization method where the stem polymer is first synthesized and then it is copolymerized with comonomers as branches.

In general, graft-copolymers which are produced using the macromonomer method have the following advantages.

(1) Production of only a small amount of homopolymers composed of only branch components or stem components occurs. Accordingly, the purity of the graft-copolymer to be prepared is high.

(2) Control of the molecular weight of the branch moieties, the molecular weight of the total graft-copolymer and the proportion of the branch moieties and the stem moiety is easy.

(3) By varying the combination of the branch components and the stem components, molecular planning to produce the desired copolymers may freely be effected.

(4) It is known that the reactivity rate in copolymerization of preparing macromonomers is the same as the reactivity rate of the corresponding monomers. Therefore, copolymerization in preparing macromonomers may be effected in the same manner as the general polymerization of monomers.

The graft-copolymers for use in the present invention can easily be prepared using the macromonomer method, where the moieties to be branches are macromonomerized and then copolymerized with the comonomer components. The components to be macromonomerized may be either those of the grains (or components which are insoluble in a carrier liquid) or those to be solvated (or components which are soluble in a carrier liquid). Accordingly, the copolymerizing comonomers are selected from solvating monomers when the macromonomers are components to form grains, while monomers to form grains are selected when the macromonomers are solvating components. Two or more kinds of comonomers may be employed in combination, if desired.

Examples of macromonomers and comonomers forming components which are insoluble in a carrier liquid and components soluble in the same include vinyl group-containing monomers, as well as monomers having a polycondensable or polyaddable functional group, such as a carboxyl group, a hydroxyl group, an amino group, an isocyanate group, an epoxy group or an acid anhydride containing group. Above all, vinyl group-containing monomers are advantageous.

In the monomers, those to form components which are insoluble in the carrier liquid are, as examples, represented by the following general formula (1), and those to form components which are soluble in the carrier liquid are as examples, represented by the following general formula (2).

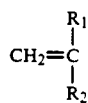
(1)

wherein $R_1$ represents a hydrogen atom or a methyl group; and $R_2$ represents $-COOR_3$, $-O-COR_3$,

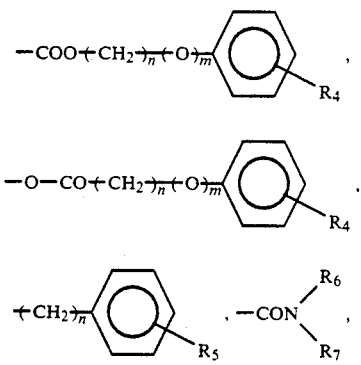

or CN.

In these groups, $R_3$ represents a substituted or unsubstituted alkyl group having from 1 to 3 carbon atoms, a cycloalkyl group having from 3 to 8 carbon atoms, or a residue of a crosslinked hydrocarbon compound.

Examples of substituents for the alkyl group are a hydroxyl group, a halogen atom (e.g., chlorine, bromine, fluorine), a cyano group, and an alkoxy group having from 1 to 3 carbon atoms. The crosslinked hydrocarbon compounds are preferably those having from 4 to 18 carbo n atom s (e.g ., adamantane bicyclo(3,2,-1)octane, bicyclo(5,2,0) nonane, bicyclo(4,3,2)undecane).

$R_4$ represents a hydrogen atom, an alkyl group having from 1 to 4 carbon atoms, a halogen atom (e.g., chlorine, bromine, fluorine), a nitro group, a cyano group or a hydroxyl group. The number of the substituent $R_4$'s on the phenyl group may be from 1 to 3.

n represents from 0 to 2; and m represents 0 or 1.

$R_5$ represents a hydrogen atom, a methyl group, an ethyl group, a halogen atom (e.g., chlorine, bromine, fluorine), a nitro group, a cyano group or a hydroxyl group. The number of the substituents $R_5$'s on the phenyl group may be from 1 to 3.

n represents from 0 to 2.

$R_6$ and $R_7$ may be same or different and each represents an alkyl group having from 1 to 4 carbon atoms.

Specific examples of monomers which can be used are methyl acrylate, methyl methacrylate, ethyl acrylate, ethyl methacrylate, n-propyl methacrylate, isopropyl methacrylate, trifluoromethyl methacrylate, 3-chloro-2-hydroxypropyl methacrylate, cyclopropyl acrylate, cycloheptyl acrylate, cyclopropyl methacrylate, cycloheptyl methacrylate, cyclohexyl acrylate, cyclooctyl acrylate, cyclooctyl methacrylate, vinyl acetate, vinyl propionate, vinyl chloroacetate, ethoxymethyl methacrylate, methoxyethyl methacrylate, isobromyl methacrylate, adamantyl methacrylate, 2-hydroxyethyl methacrylate, 2-phenoxyethyl methacrylate, benzyl acrylate, benzyl methacrylate, p-methylbenzyl methacrylate, vinyl benzoate, vinyl-p-methylbenzoate, vinyl p-isopropyl, benzoate, vinyl-p-t-butylbenzoate, styrene, p-methylstyrene, p-chlorostyrene, p-nitrostyrene, acrylo-nitrile, methacrylonitrile, N,N-dimethylacrylamide and N,N-dimethylmethacrylamide.

Of these monomers, preferred monomers are methacrylates such as methyl methacrylate, ethyl methacrylate, cyclohexyl methacrylate and benzyl methacrylate as well as styrene and p-methylstyrene.

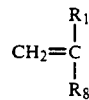
(2)

wherein $R_1$ represents a hydrogen atom or a methyl group; and $R_8$ represents $-COOR_9$, $-O-COR_9$, $-OR_9$,

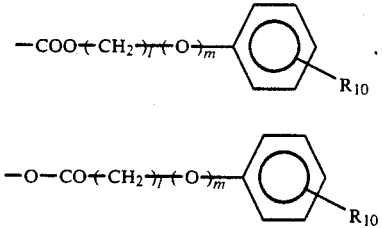

or

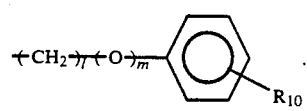

In these groups, $R_9$ represents a linear or branched substituted or unsubstituted alkyl group having from 6 to 22 carbon atoms. Examples of substituents on the alkyl group are a hydroxyl group, a halogen atom (e.g., chlorine, bromine, fluorine), a phenyl group, a cyano group and a nitro group.

$R_{10}$ represents a linear or branched substituted or unsubstituted alkyl group having from 4 to 12 carbon atoms. Examples of substituents on the alkyl group include those mentioned above.

l represents from 0 to 6; and m represents 0 or 1:

Specific examples of suitable monomers include n-hexyl acrylate, n-hexyl methacrylate, n-heptyl methacrylate, n-octyl acrylate, n-octyl methacrylate, 2-ethylhexyl acrylate, 2-ethylhexyl methacrylate, n-decyl acrylate, n-decyl methacrylate, isodecylmethacrylate, n-dodecyl acrylate, n-dodecyl methacrylate, isodecyl methacrylate, isostearyl methacrylate, stearyl methacrylate, behenyl methacrylate, vinyl caprate, vinyl laurate, vinyl stearate, vinyl behenate, vinyl-n-hexyl ether, vinyl-2-ethylhexyl ether, vinyl-dodecyl ether, vinylstearyl ether, p-2-ethylhexylbenzyl methacrylate, p-n-butylstyrene and p-2-ethylhexyl styrene.

Among these compounds, preferred are long-chain alkyl (meth)acrylates such as n-octyl methacrylate, n-octyl acrylate, 2-ethylhexyl methacrylate, dodecyl methacrylate, dodecyl acrylate and stearyl methacrylate.

In accordance with the present invention, macromonomers are employed as components of either soluble monomers or insoluble monomers of the graft copolymers for use in the invention. The methods described, for example, in Y. Kawakami & Y. Yamashita, *Chemistry*, Vol. 37, No. 8, page 588 (1982); P.F. Rempp & E. Franta, *Advanced Polymer Science*, Vol. 58, No. 1 (1984); K. Itoh, *Processing of High Polymers*, Vol. 35, No. 6, page 262 (1986); P. Dryfuses & R.P. Quirk, *Encycl Polym. Sci. Eng.*, 7, 551 (1987); V. Percec, *Appl. Polym. Sci.*, 285, 95 (1984); R. Asami & M. Takaki, *Makromol. Chem. Suppl.*, 12, 163 (1985); P. Rempp, et al, *Makromol. Cheml. Suppl.*, 8, 3 (1984); Y. Kawakami, *Chemical Industry*, 38, 56 (1987); Y. Yamashita, *High Polymers*, 31, 988(1982); S. Kobayashi, *High Polymers*, 30, 625 (1981); To. Tomura, *Journal of Japan Adhesive Association*, 18, 536 (1982); and S. Tohki & T. Tsuda, *Functional Materials*, No. 10, 5 (1987) for producing macromonomers to be used in the invention.

For producing macromonomers having a polymerizable terminal double bond, the following methods can be employed.

(1) A double bond is introduced into the polymer terminal by a polymerization reaction, using a double bond-containing initiator or stopper.

(2) A prepolymer having a terminal functional group is produced using a chain-transferring agent or stopper having an appropriate functional group, and the functional group of the resulting prepolymer is then reacted with a double bond-containing compound to introduce a double bond into the polymer terminal.

(3) A bi-functional vinyl monomer and a bi-functional compound are reacted in a polyaddition reaction, whereupon the polyaddition reaction is controlled so as to keep a non-reacted vinyl group at the terminal of the resulting polymer.

The macromonomers for use in the present invention preferably have a molecular weight of from 1,000 to 5,000, more preferably from 2,000 to 20,000, as a number average molecular weight based on polystyrene by GPC method.

Methods of production are described below in more detail.

EXAMPLES AND METHOD (1)

A living polymer of polystyrene is reacted with p-vinylbenzyl chloride to produce a terminal styrene-type polystyrene macromonomer in accordance with the following:

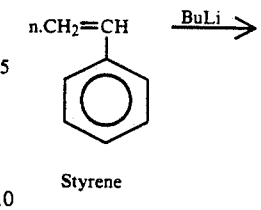

Styrene

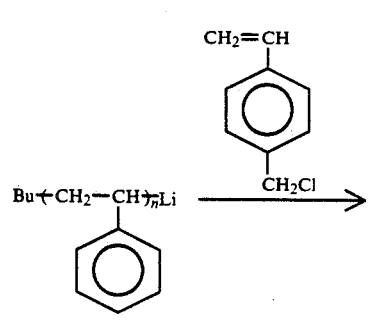

Polystyrene Living Polymer

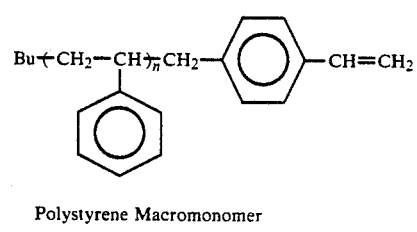

Polystyrene Macromonomer

Bu=butyl, hereinafter the same

Alternatively, a different method can be used where the reactant is reacted with ethylene oxide in the course of the reaction to form a terminal alkoxide for endocapping and thereafter the intermediate is reacted with methacryloyl chloride, as follows:

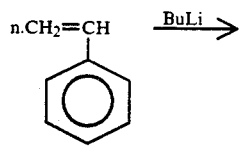

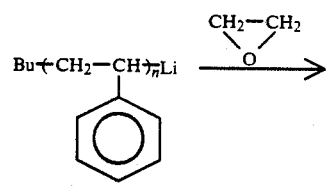

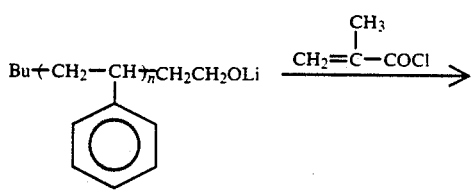

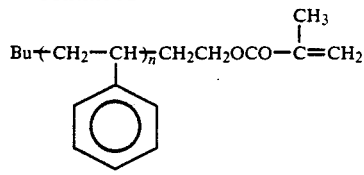

Polystyrene Macromonomer

EXAMPLES OF METHOD (2)

An acrylic monomer is radical-polymerized in the presence of a mercaptan-type chain-transferring agent to produce a macromonomer, as follows:

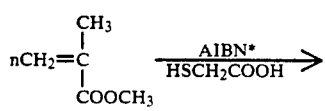

Methyl Methacrylate

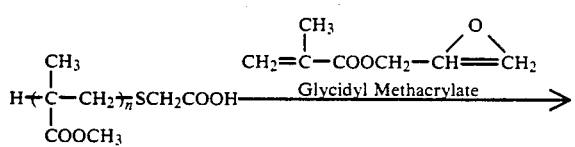

Terminal Carboxyl-Group
Containing Prepolymer

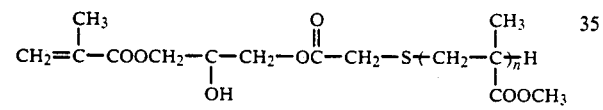

Polymethyl Methacrylate Macromonomer
*AIBN: 2,2'-Azobisisobutyronitrile

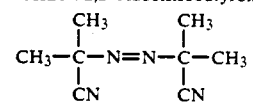

In the polymerization to obtain macromonomers for use in the present invention, the living polymerization method (1) or the radical polymerization method (2) can be employed. The former method may be used to produce macromonomers having a uniform molecular weight polymerization, but control of polymerization reaction in the method is difficult. On the other hand, although the latter method is inferior to the former method in terms of the uniformity of the molecular weight distribution of the macromonomers obtained, it is industrially practicable since the reaction itself is easy.

Where a bi-functional compound is used as a chain-transferring agent in method (2), one-terminal carboxylic acid/diol macromonomers are obtained and they can be utilized for preparing graft-copolymers of polyesters or polyurethanes.

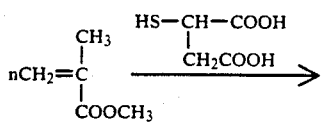

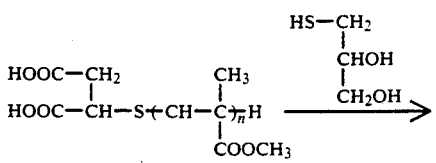

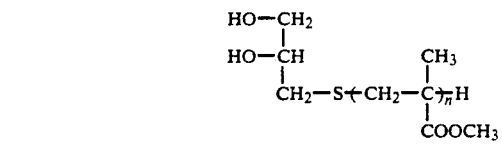

Specific examples of macromonomers which can be used to form the graft-copolymers of the present invention are described below, which, however, are not to be construed as limiting the present invention.

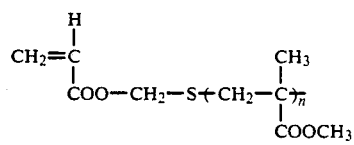

(1)

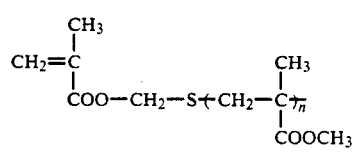

(2)

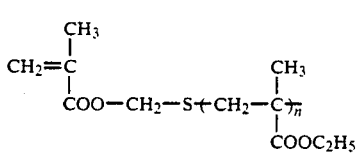

(3)

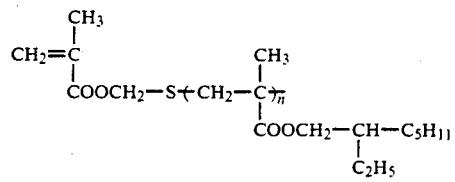

(4)

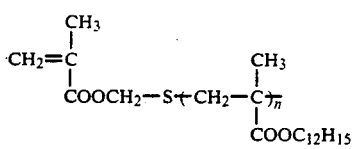

(5)

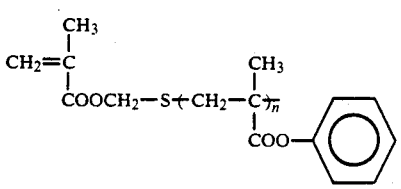

(6)

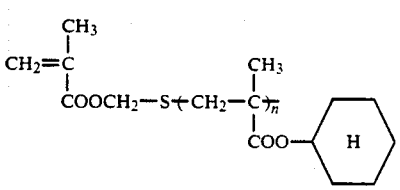

(7)

-continued

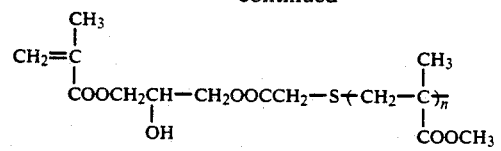 (8)

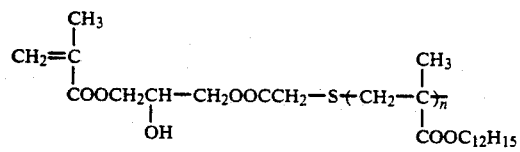 (9)

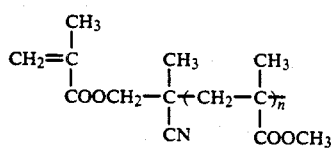 (10)

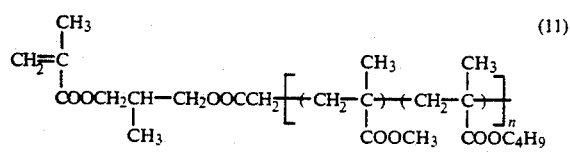 (11)

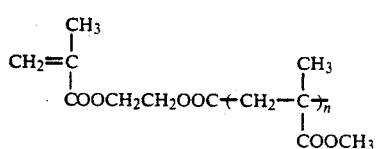 (12)

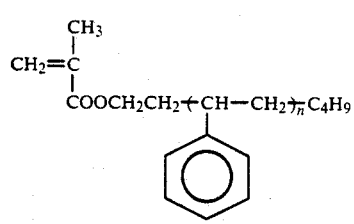 (13)

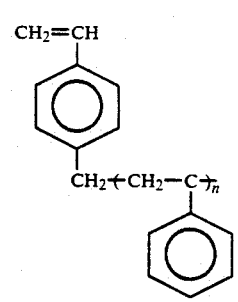 (14)

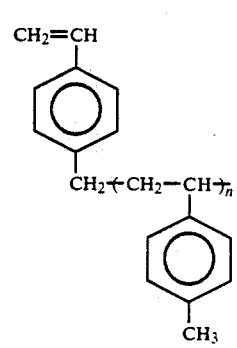 (15)

-continued

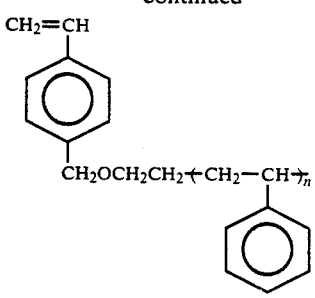 (16)

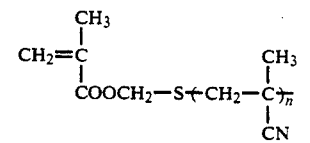 (17)

Commercial products can be used as these macromonomers.

For example, these macromonomers commercial products are available as from Satomer Co., Toa Gosei Chemical Industry Co., Soken Chemical Co., and Nippon Oils & Fats Co.

Some examples of commercial macromonomers which can be used in the present invention are described below. These are commercially available from Toa Gosei Chemical Industry Co.

| Terminal Group | Segment | Molecular Weight | Trade Name |
|---|---|---|---|
| Methacryloyl | Styrene | 6000 | AS-6 |
| 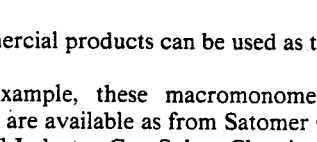 | Styrene/Acrylonitrile | 6000 | AN-6 |
| | Methyl Methacrylate | 6000 | AA-6 |
| | Butyl Methacrylate | 6000 | AB-6 |
| | Silicone | 5000 | AK-6 |
| Dicarboxyl | Styrene | 6000 | CS-6 |
| HOOC—CH$_2$ | Styrene/Acrylonitrile | 6000 | CN-6 |
| \| | Butyl Acrylate | 6000 | CB-6 |
| HOOC—CH— | | | |
| Dihydroxyl | Styrene | 6000 | HS-6 |
| HO—CH$_2$ | Styrene/Acrylonitrile | 6000 | HN-6 |
| \| | Methyl Methacrylate | 6000 | HA-6 |
| HO—CH— | | | |

Molecular Weight: Number Average Molecular Weight by the GPC method

Graft-copolymers for use in the present invention may be prepared from the macromonomers by copolymerization such as by addition polymerization, by polycondensation or by polyaddition with appropriate co-monomers.

It is considered that a macromonomer is a kind of a monomer and it is known that they are little different in the reactivity. Accordingly, it is considered that the synthesis of a graft copolymer from a macromonomer is the same as that in usual polymerization reaction. In a case of addition polymerization (radical polymerization), it is possible to apply all polymerization method such as a bulk polymerization, a solution polymerization, a suspension polymerization, and an emulsion polymerization. Usually, a solution polymerization is applied. It is disclosed, for example, in G. O. Schulz, R. Milkovich; J. Polym. Sci., Polym. Ed., 22, 1633 (1984), J.C.J.F. Tacx, H.N. Linssen, A. L. German; J. Polym. Sci.; Part A: Polym. Chem. 26, 61 (1988). As an initiator, there are, for example, azobis compounds (e.g., AIBN), peroxides (e.g., benzyl peroxide), redox initiators (e.g., persulfate, $NaHSO_3$)

Two or more macromonomers can be used in combination, provided that they are copolymerizable. Additionally, two or more copolymerizing comonomers may also be used in combination.

In particular, terminal vinyl group-having macromonomers are advantageously used as they may easily be polymerized with vinyl group-having comonomers by radical polymerization.

Any known initiators for radical polymerization can be employed.

The graft-copolymers for use in the present invention preferably have a molecular weight of from 3,000 to 500,000, more preferably from 10,000 to 200,000, as a number average molecular weight measured by the GPC method.

The proportion of the component which is insoluble in a carrier liquid to that which is soluble in the carrier liquid in the graft-copolymer for use in the present invention can vary but is generally so selected that the graft-copolymer is substantially insoluble in the carrier liquid. In general, therefore, the proportion of the insoluble component to the soluble component is from 30/70 to 99/1, preferably from 40/60 to 95/5, by weight.

The term "substantially insoluble graft-copolymer" means that when a 5 wt % solution of the graft-copolymer is subjected to centrifugation at 15,000 rpm for 60 minutes, the precipitate (corresponding to grains in the solution) is 30% by weight or more to the total weight.

Although not completely clear, the reason why the graft-copolymer of the present invention is self-dispersible is believed to be as follows. The graft-copolymer which is composed of a component insoluble in a carrier liquid and a component soluble in the carrier liquid is present in the carrier liquid in the form of micelles where the insoluble parts are oriented toward the inside and the soluble parts are oriented toward the outside. Where the insoluble parts are present in an amount larger than that of the soluble parts, the micelles consist essentially of grains. In the opposite case, the micelle is a soluble one. The graft-copolymer of the present invention, which is prepared from the above-mentioned macromonomers, contains only a small amount of homopolymers and other impurities, as mentioned above. Therefore, it is believed that the graft-copolymer of the invention displays this intrinsic property, even though it is in a solid form.

In the present invention, a non-aqueous solvent having an electrical resistance of $1 \times 10^9$ $\Omega$cm or more and a dielectric constant of 3 or less is used as a carrier liquid. Examples of suitable non-aqueous solvents, for example, include solvents of linear or branched aliphatic hydrocarbons, alicyclic hydrocarbons, aromatic hydrocarbons and halogenated hydrocarbons. Considering low vaporizability, high safety, low environmental pollution and low odor, octane, isooctane, decane, isodecane, dodecane, isododecane, nonane, isoparaffin petroleum solvents of Isopar E, Isopar G, Isopar H and Isopar L (trade names of the Exxon Co.), as well as Isododecane (BP Chemical), Shell Sol 71 (Shell), and IP Sorbent 1620 (Idemitsu Petrochemical) are preferred.

Various known inorganic pigments, organic pigments and dyes can be used as the pigment or dye for use in the present invention.

For instance, usable pigments and dyes include metal powders such as aluminium powder; metal oxides such as magnetic iron oxide, zinc oxide, titanium oxide or silicon dioxide; metal salts such as powdery lead cadmium-selenium-chromate; as well as Vulcan Fast Yellow (C.I. 21095, C.I. 21220), Hansa Yellow (C.I. 11680, C.I. 11730, C.I. 11710), Benzidine Yellow (C.I. 21090, C.I.21100), Benzidine Orange (C.I. 21110), Fast Red (C.I. 37085, C.I. 37120, C.I. 37275), Brilliant Carmine 3B (C.I. 16015-Lake), Brilliant Carmine 6B (C.I. 15850), Phthalocyanine Blue (C.I. 74160), Heliogen Blue (C.I. 74100), Threne Blue (C.I. 69800), Phthalocyanine Green (C.I. 74260), Victoria Blue (C.I. 42595-Lake), Spirit Black (C.I. 50415), Oil Blue (C.I. 74350), Alkali Blue (C.I. 42770A), Fast Scarlet (C.I. 12315), Rhodamine 6B (C.I. 45160), Fast Sky Blue (C.I. 74200-Lake), Nigrosene (C.I. 50415), and carbon black. Additionally, surface-treated pigments, for example, nigrosene-dyed carbon black or graft carbon prepared by graft-polymerization of carbon and a polymer, may also be used.

Any known charge-adjusting agent may be incorporated into the liquid developing agent of the present invention. For instance, substances usable as a charge-adjusting agent include metal salts of fatty acids such as naphthenic acid, octenoic acid, oleic acid or stearic acid; metal salts of sulfosuccinates; oil-soluble metal salts of sulfonic acid, as described in JP-B-45-556, JP-A-52-37435 and JP-A-52-37049; metal salts of phosphates, as described in JP-B-45-9594; metal salts of abietic acids or hydrogenated abietic acids, as described in JP-B-48-25666; calcium salts of alkylbenzenesulfonic acids, as described in JP-B-55-2620; metal salts of aromatic carboxylic acids or sulfonic acids, as described in JP-A-52-107837, JP-A-52-38937, JP-A-57-90643 and JP-A-57-139753; nonionic surfactants such as polyoxyethylated alkylamines; fats and oils such as lecithin or linseed oil; polyvinyl pyrrolidones; organic acid esters with polyhydric alcohols; phosphate surfactants as described in JP-A-57-210345; and sulfonic acid resins as described in JP-B-56-24944. Additionally, amino acid derivatives as described in JP-A-60-21056 and JP-A-61-50951 may also be employed. These amino acid derivatives are compounds of the following formula (3) or (4), or a reaction mixture prepared by reacting an amino acid with a methane compound in an organic solvent followed by further reaction of the reaction mixture with water.

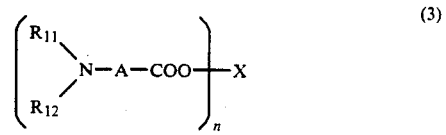

(3)

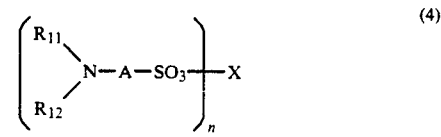

(4)

In these formulae, $R_{11}$ and $R_{12}$ each represent a hydrogen atom, an alkyl group having from 1 to 22 carbon atoms, a substituted alkyl group having from 1 to 22 carbon atoms (e.g., substituted with a dialkylamino group, an acyloxy group or an alkylthio group), an aryl group having from 6 to 24 carbon atoms, a substituted aryl group having from 6 to 24 carbon atoms (e.g., substituted with a dialkylamino group, an alkyloxy group, an alkylthio group, a chlorine atom, a bromine atom, a cyano group, a nitro group, or a hydroxyl group), an aralkyl group having from 6 to 24 carbon atoms, an acyl group having from 1 to 22 carbon atoms, an alkylsulfonyl group having from 1 to 22 carbon atoms, an alkylphosphonyl group having from 1 to 22 carbon atoms, an arylsulfonyl group having from 6 to 24 carbon atoms, or an arylphosphonyl group having from 6 to 24 carbon atoms. $R_{11}$ and $R_{12}$ may be same as Or different from each Other. $R_{11}$ and $R_{12}$ may combine and form a ring, but $R_{11}$ and $R_{12}$ are not simultaneously hydrogen atoms. A represents an alkylene or substituted alkylene group having from 1 to 10 carbon atoms. X represents a hydrogen atom, or a mono- to tetra-valent metal (e.g., Na, K, Ca, Mg, Al, Fe, Co, Ni, Zn, Mn, Ti), or a quaternary ammonium ion. n represents a positive integer.

Additionally, quaternatry amine polymers is described in JP-A-54-31739 and JP-B-56-24944 may also be used.

Above all, preferred examples are metal salts of naphthenic acid, metal salts of dioctylsulfosuccinic acid and the above-described amino acid derivatives. Further preferred are zirconium, cobalt or manganese naphthenate, calcium or sodium dioctylsulfosuccinate and metal salts of the compounds of formula (3) described above. Titanium, cobalt, zirconium and nickel salts thereof are especially preferred as metal salts of the compounds of formula (3) above.

In order to increase the dispersibility of the self-dispersible solid colorant of the present invention and to increase the stability of the dispersion of the colorant, a dispersing agent may be applied to the colorant. The dispersing agent to be used for the purpose is a resin which is soluble in a carrier liquid and which is adsorbed on the toner grains to thereby improve the dispersibility of the grains. Examples of suitable dispersing agents are rubbers such as styrene-butadiene, vinyltoluene-butadiene or butadiene-isoprene; polymers of acrylic monomers having a long-chain alkyl group, such as 2-ethylhexyl (meth)acrylate, lauryl (meth)acrylate or stearyl (meth)acrylate; copolymers of these acrylic monomers with other monomers (e.g., styrene, (meth)acrylic acid and the methyl, ethyl or propyl ester thereof); and macromonomer-grafted graft-copolymers as described in Japanese Patent Application No. 1-253252.

The dispersing agent may be added to the self-dispersing colorant or it may previously be added to a carrier liquid.

Methods of preparing the self-dispersing colorant, toner supply and toner kit of the present invention are described in detail below.

When the self-dispersing graft-copolymer of the invention is used as a dispersion of resin grains, it can be used in the form of a mass, tablet or powder. A colorant comprising the graft-copolymer and a pigment or dye may be prepared using the methods described below.

(1) The graft-copolymer is melt-kneaded with a pigment or dye at a temperature higher than the softening point of the graft-copolymer using a roll mill, Bumbury mixer or kneader and then optionally powdered. The kneaded blend or powder is then formed into a mass, tablets, granules or a powder.

(2) The graft-copolymer is dissolved in a solvent, a pigment or dye is added thereto and wet-dispersed using a ball mill, attritor or sand grinder. Then the solvent is evaporated from the blend to obtain the desired colorant. Alternatively, the resulting dispersion is poured into a non-solvent for the graftcopolymer to obtain a mixed blend, which is then dried to obtain a colorant.

(3) In a flashing method, a hydrous paste of a pigment is kneaded along with a resin or a resin solvent, and the water in the resulting mix is replaced by a resin or a resin solution. Then, the water or solvent is removed by drying (under reduced pressure) to obtain an intended colorant.

For preparing a toner supply for a liquid developing agent for electrostatic photography, a charge-adjusting agent or a dispersing agent is added to the copolymer during kneading, or is added thereto during powdering of the tablets obtained from the kneaded mix.

The carrier liquid may be used as it is when the carrier liquid is used alone as the carrier liquid for the toner kit of the present invention. If the carrier liquid contains a charge-adjusting agent or a dispersing agent, necessary amount of these agents may be added to the carrier liquid.

In the colorant of the invention, the proportion of the graft-copolymer to the pigment or dye is from 0.1/1 to 100/1, preferably from 0.3/1 to 30/1, by weight.

The amount of the charge-adjusting agent in the liquid developing agent of the invention is preferably from 0.001 to 10 g, more preferably from 0.01 to 3 g, per liter of the carrier liquid in the agent.

Where the colorant contains a dispersing agent, the amount of the agent therein is preferably from 0.001 to 20 parts by weight, more preferably from 0.03 to 10 parts by weight, to one part by weight of the graft-copolymer. Where a dispersing agent is present in a carrier liquid, the amount of the agent is preferably from 0.01 to 50 g, more preferably from 0.1 to 20 g, per liter of the carrier liquid.

The amount of the toner grains in the liquid developing agent of the invention can vary, but preferably is from 0.01 to 50 g, more preferably from 0.1 to 20 g, per liter of the carrier liquid in the agent.

Any known organic photoconductor or inorganic photoconductor may be employed as a photoreceptor to be used in the present invention. Additionally, a dielectric charged with a charging needle may also be used.

Suitable organic photoconductor which can be employed with the present invention include known photoconductors. For example, the materials described in *Research Disclosure* No. 10938 (May, 1973, from page 61 on, report with a title of *Electrophotographic Elements, Materials and Processes* can be used.

Examples which are now practically used and which may be employed with the present invention are, for example, an electrophotographic photoreceptor composed of polyvinyl-N-carbazole and 2,4,7-trinitrofluoren-9-one (U.S. Pat. No. 3,484,237); poly-N-vinylcarbazole sensitized with a pyrylium salt dye (JP-B-48-25658): an electrophotographice photoreceptor consisting essentially of an organic pigment (JP-A-49-543); an electrophotographic photoreceptor consisting essentially of an eutectic complex composed of a dye and a resin (JP-A-47-10735); and an electrophotographic photoreceptor comprising copper phthalocyanine dispersed in a resin (JP-B-52-1667). Additionally, the materials described in *Journal of Japan Electrophotographic Society*, Vol. 25, pages 62 to 76 may also be used.

Examples of inorganic photoconductors which may be employed with the present invention include various inorganic compounds as described in R. M. Schaffert, *Electrophotography* (published by Focal Press, London, 1975), pages 260 to 374 are typical. Specific examples include zinc oxide, zinc sulfide, cadmium sulfide, selenium selenium-tellurium alloy, selenium-arsenic alloy, and selenium-tellurium-arsenic alloy.

Examples of the present invention are described below, which, however, are not intended to limit the scope of the present invention. Unless otherwise indecated, all parts, percents, ratios and the like are by weight.

Production of Macromonomer (1):

A mixture comprising 92 g of methyl methacrylate, 6 g of thioglycolic acid and 220 g of toluene was heated to 75° C. with stirring under a nitrogen atmosphere. Next, 31 g of 2,2'-azobis (cyanovaleric acid) (A.C.V.) was added thereto and reacted for 8 hours. Next, 8 g of glycidyl methacrylate, 1.0 g of N,N-dimethyldodecylamine and 0.5 g of t-butylhydroquinone were added to the reaction mixture and stirred at a temperature of 100° C. for 12 hours. After cooling, the reaction mixture was re-precipitated in 3 liters of methanol to obtain 82 g of a white powder. The polymer thus prepared had a number average molecular weight of 6,000.

PRODUCTION OF MACROMONOMER (2)

A mixture comprising 93 g of dodecyl methacrylate, 8 g of 3-mercaptopropionic acid, 200 g of toluene and 30 g of isopropanol was heated to 70° C. under a nitrogen atmosphere to obtain a uniform solution. 1.0 g of azo-bis-isobutyronetrile (A.I.B.N.) was added thereto and reacted for 12 hours. After cooling, the reaction solution was re-precipitated in 2 liters of methanol and then heated at a temperature of 50° C. under reduced pressure to remove the solvent by distillation. The thus obtained viscous product was dissolved in 200 g of toluene; and 16 g of glycidyl methacrylate, 1.0 g of N,N-dimethyldodecyl methacrylate and 1.0 g of t-butylhydroquinone were added to the resulting solution and thereafter stirred at a temperature of 110° C. for 10 hours. The resulting reaction solution was again re-precipitated in 2 liters of methanol. A pale yellow viscous product was obtained, which had a number average molecular weight of 4,000.

PRODUCTION OF GRAFT-COPOLYMER (1)

A graft-copolymer (1) was prepared, using a styrene macromonomer (AS-6, commercially available from Toa Gosei Chemical Industry Co.).

Specifically, 90 g of AS-6, 10 g of stearyl methacrylate and 200 g of toluene were put in a 500 ml-four neck flask equipped with a stirrer, a thermometer, a condenser and a nitrogen gas inlet, and they were heated and stirred therein at 80° C. for 1 hour while introducing nitrogen gas. Next, 1 g of a polymerization initiator of 1,1'-azobis(1-cyclohexanecarbonitrile) was added to the mixture and the resulting mixture was polymerized at 80° C. for 24 hours. After the polymerization, the reaction mixture was cooled to room temperature, and 200 g of toluene was added thereto. This was then re-precipitated in 4 liters of methanol. The resulting re-precipitate was then washed several times with methanol and dried in vacuum. Accordingly, a white powdery solid was obtained.

PRODUCTION OF GRAFT-COPOLYMERS (2) to (9)

Graft-copolymers (2) to (9) described below were prepared in the same manner as in the preparation of Graft-copolymer (1).

PRODUCTION OF GRAFT-COPOLYMER (1)

80 g of Macromonomer (1) as prepared in Example 1, 20 g of stearyl methacrylate and 200 g of toluene were put in a 500 ml-four neck flask equipped with a stirrer, a thermometer, a condenser and a nitrogen gas inlet and they were heated and stirred therein at 70° C. for 1 hour while introducing nitrogen gas. Next, 1.0 g of a polymerization initiator of 2,2'-azobisbutyronitrile was added to the mixture so that the resulting mixture was polymerized at 70° C. for 24 hours. After polymerization, the reaction mixture was cooled to room temperature, and 200 g of toluene was added thereto. This was then re-precipitated in 4 liters of methanol. The resulting re-precipitate was then washed several times with methanol and dried in vacuum. Accordingly, a white powdery solid was obtained.

Macromonomers and comonomers used for preparing the above-mentioned graft-copolymers, the molecular weight of each of the graft-copolymers formed, as well as the self-dispersibility of each graft-copolymer when added to a carrier liquid comprising Isopar G and the size of the dispersed grains thereof in Isopar G are shown in Table 1 below.

| Graft-Copolymer | Macromonomer (A) | Comonomer (B) | A/B Ratio (by weight) |
|---|---|---|---|
| 2 | AS-6 (styrene macro-monomer produced by Toa Gosei Chemical Industry) | Stearyl Methacrylate | 80/20 |
| 3 | AS-6 (styrene macro-monomer produced by Toa Gosei Chemical Industry) | Stearyl Methacrylate | 70/30 |
| 4 | AS-6 (styrene macro-monomer produced by Toa Gosei Chemical Industry) | Stearyl Methacrylate | 50/50 |
| 5 | AS-6 (styrene macro-monomer produced by Toa Gosei Chemical Industry) | Lauryl Methacrylate | 70/30 |
| 6 | AS-6 (styrene macro-monomer produced by Toa Gosei Chemical Industry) | 2-Ethylhexyl Methacrylate | 70/30 |
| 7 | AA-6 (methyl methacrylate macro-monomer produced by Toa Gosei Chemical Industry) | Stearyl Methacrylate | 80/20 |
| 8 | AA-6 (methyl methacrylate macro-monomer produced by Toa Gosei Chemical Industry) | Lauryl Methacrylate | 80/20 |
| 9 | AA-6 (methyl meth-acrylate macro- | 2-Ethylhexyl Methacrylate | 80/20 |

| Graft-Copolymer | Macromonomer (A) | Comonomer (B) | A/B Ratio (by weight) |
|---|---|---|---|
| | monomer produced by Toa Gosei Chemical Industry | | |

TABLE 1

| No. | Macromonomer (A) | Comonomer (B) | Graft-Copolymers A/B Ratio (by weight) | Molecular Weight[1] | Content of Grains[2] (%) | Grain Size[3] ($\mu$) | Self-Dispersibility[4] |
|---|---|---|---|---|---|---|---|
| 1 | AS-6 | Stearyl Methacrylate | 90/10 | $3.2 \times 10^4$ | 98 | 0.10 | Clouded, and partly precipitated. |
| 2 | " | Stearyl Methacrylate | 80/20 | $3.4 \times 10^4$ | 93 | 0.13 | Clouded, but not precipitated. |
| 3 | " | Stearyl Methacrylate | 70/30 | $3.5 \times 10^4$ | 72 | 0.14 | Clouded, but not precipitated. |
| 4 | " | Stearyl Methacrylate | 50/50 | $4.1 \times 10^4$ | 32 | 0.20 | Clouded, but not precipitated. |
| 5 | " | Lauryl Methacrylate | 70/30 | $3.5 \times 10^4$ | 71 | 0.13 | Clouded, but not precipitated. |
| 6 | " | 2-Ethylhexyl Methacrylate | 70/30 | $3.6 \times 10^4$ | 74 | 0.12 | Clouded, but not precipitated. |
| 7 | AA-6 | Stearyl Methacrylate | 80/20 | $3.2 \times 10^4$ | 90 | 0.10 | Clouded, but not precipitated. |
| 8 | " | Lauryl Methacrylate | 80/20 | $3.3 \times 10^4$ | 88 | 0.11 | Clouded, but not precipitated. |
| 9 | " | 2-Ethylhexyl Methacrylate | 80/20 | $3.2 \times 10^4$ | 92 | 0.10 | Clouded, but not precipitated. |
| 10 | Macromonomer (1) | Stearyl Methacrylate | 80/20 | $1.8 \times 10^4$ | 81 | 0.11 | Clouded, but not precipitated. |

[1] Molecular Weight: number average molecular weight based on polystyrene, measured by GPC.
[2] Content of Grains: Amount (wt %) of precipitate as precipitated by centrifugation in Isopar G (5 wt %) dispersion at 1500 rpm for 1 hour.
[3] Grain Size: measured with a Nanosizer (manufactured by Nikkaki).
[4] Self-Dispersibility: behavior of graft-copolymer grains in Isopar G.

PRODUCTION OF COMPARATIVE COPOLYMERS (1) to (4)

Comparative copolymers (1) to (4) described below were prepared, using monomers in general in place of macromonomers.

Specifically, 90 g, 80 g, 70 g of styrene, 10 g, 20 g, 30 g or 50 g of stearyl methacrylate and 200 g of toluene were subjected to polymerization in the same manner as in preparation of Graft-copolymer (1) to prepare Comparative Copolymers (1) to (4), respectively. These copolymers were all random copolymers, which are shown in Table 1' below.

TABLE 1'

| Comparative Copolymer | Monomer (A) | Monomer (B) | A/B Ratio (by weight) | Molecular Weight[1] | Solubility[2] |
|---|---|---|---|---|---|
| 1 | Styrene | Stearyl Methacrylate | 90/10 | $2.3 \times 10^4$ | 15% swollen |
| 2 | " | " | 80/20 | $2.6 \times 10^4$ | 25% swollen |
| 3 | " | " | 70/30 | $3.0 \times 10^4$ | 75% almost dissolved |
| 4 | " | " | 50/50 | $3.3 \times 10^4$ | 100% dissolved |

[1] Molecular Weight: number average molecular weight by GPC.
[2] Solubility: Amount dissolved in Isopar (5 wt %).

None of the Comparative Copolymers (1) to (4) were self-dispersed in Isopar G but dissolved therein. It is clear that the properties of these Comparative Copolymers (1) to (4) are different from the graft-copolymers of the present invention prepared by the macromonomer method.

EXAMPLE 1

20 g of Graft-copolymer (2) was dissolved in 100 g of toluene, and 5 g of Carbon Black #30 (manufactured by Mitsubishi Kasei Corp.) was added thereto and dispersed for one hour using a paint shaker. The resulting dispersion was dried on a stainless steel vat and then dried at 50° C in vacuum. The dried graft-copolymer/carbon black colorant was powdered in a sample mill (manufactured by Kyoritsu Rika Co.). Each of the powdered colorant (0.1 to 0.01 mm) and the non-powdered colorant (1 to 5 mm) was placed in Isopar G (isoparaffin hydrocarbon solvent, manufactured by Exxon Co.) and self-dispersibility was evaluated. As a result, both colorants were well self-dispersed in the solvent to produce stably dispersed grains. In both cases, the colorant spontaneously self-dispersed in the solvent after it was left as it was in the solvent without stirring.

TABLE 2

| Colorant | Size | Self-Dispersibility | Grain Size of Dispersed Grains |
|---|---|---|---|
| Pinmill Powdered | 0.1 to 0.01 mm | Self-dispersed within 6 hours | 0.32 micron |
| Non-powdered | 1 to 5 mm | Self-dispersed in one day | 0.31 micron |

In the self-dispersion test, 1 g of the colorant to be tested was added to 50 g of Isopar G and was then left at it was. Afterwards, the dispersion condition of the resulting dispersion was evaluated.

EXAMPLES 2 TO 4

Other black colorant dispersions were prepared in the same manner as in Example 1, except that Graft-copolymer (1), (3) or (4) was used. These were tested in the same manner as in Example 1, and the results obtained are shown in Table 3 below.

TABLE 3

| Ex. No. | Graft-Copolymer | Size of Powdered Colorant | Self Dispersibility | Grain Size of Dispersed Grains |
|---|---|---|---|---|
| 2 | (1) | 0.1 to 0.01 mm | Almost self-dispersed within one day, but some non-dispersed precipitate remained | 0.52 micron |
| 3 | (3) | 0.1 to 0.01 mm | Completely self-dispersed within 3 hours, with no non-dispersed precipitate. | 0.30 micron |
| 4 | (4) | 0.1 to 0.01 mm | Completely self-dispersed within 3 hours, with no non-dispersed precipitate. | 0.32 micron |

As mentioned above, the colorant containing Graft-copolymer (1) was dispersed in one day, but some non-dispersed precipitate remained. However, the others all self-dispersed within 30 minutes.

EXAMPLE 5

4 parts of Graft-copolymer (2) and one part of Carbon Black #30 were melt-kneaded with a three-roll kneader heated at 120° C. for 30 minutes to obtain a black colorant.

This was powdered in the same manner as in Example 1 and then added to Isopar G, whereupon it self-dispersed therein within 6 hours to provide stably dispersed grains having a grain size of 0.35 micron.

EXAMPLES 6 TO 10

Other black colorants were prepared in the same manner as in Example 5, except that Graft-copolymers (5), (6), (7), (8) or (9) was used.

TABLE 4

| Ex. No. | Graft-Copolymer | Self-Dispersibility | Grain Size |
|---|---|---|---|
| 6 | (5) | Self-dispersed within 6 hours. | 0.33 micron |
| 7 | (6) | " | 0.45 micron |
| 8 | (7) | " | 0.47 micron |
| 9 | (8) | " | 0.45 micron |
| 10 | (9) | " | 0.43 micron |

As described above, all of the colorants were well self-dispersed in the Isopar G solvent.

EXAMPLES 11 TO 13

Cyan, yellow and magenta coloring colorants were prepared in the same manner as in Example 5, except that color pigments of copper phthalocyanine (Pigment Blue 15, manufactured by Tokyo Kasei Co.), disazo yellow (Pigment Yellow 14, manufactured by Toyo Ink Co.) and Carmine 6B (Pigment Red 57-1, manufactured by Toyo Ink Co.) were used, respectively, in place of Carbon Black #30. The self-dispersibility of each colorant was evaluated and the results are shown in Table 5 below. The formation of a powder of each colorant was achieved using a pin mill, and the grain size of the powdered colorant was from 0.1 to 0.01 mm.

TABLE 5

| Ex No. | Pigment | Self-Dispersibility | Grain Size of Dispersed Grains |
|---|---|---|---|
| 1 | Copper Phthalocyaninea | Self-dispersed within half day (12 hours) | 0.34 micron |
| 2 | Disazo Yellow | Self-dispersed within half day (12 hours) | 0.47 micron |
| 3 | Carmine 6B | Self-dispersed within half day (12 hours) | 0.70 micron |

As described above, all of the colorants were well self-dispersed and formed clear dispersions. These dispersions were stable and no noticeable precipitate was formed in one week or so.

EXAMPLE 14

10 parts of water and one part of carbon black (MA-100, manufactured by Mitsubishi Kasei Corp.) were stirred in a flasher, and 10 parts of Graft-copolymer (5) (as a 10% toluene solution) was added thereto and further stirred. Next, the contents were heated and the water and solvent were removed therefrom under reduced pressure to obtain a colorant mass having a water content of 1% by weight. A powder of this mass was produced in a sample mill to obtain a colorant powder having a grain size of from 0.1 to 0.01 mm. (Prior to powdering, the colorant mass was dried in vacuum and water was completely removed thereby.)

The self-dispersibility of the powder was educated in the same manner as in Example 5. As a result, the powder was well self-dispersed in the solvent in about one hour to provide dispersed grains having a grain size of 0.32 micron.

EXAMPLE 15

The preparation of a toner supply and a toner kit for electrostatic photography is illustrated below.

Specifically, the following components were kneaded using a three-roll mill at 80° C. for one hour.

| | |
|---|---|
| Graft-Copolymer (2) | 4 parts |
| Carbon Black #30 (manufactured by Mitsubishi Kasei Corp.) | 1 part |
| Isopar G | 1 part |
| Charge-Adjusting Agent | 0.01 part |

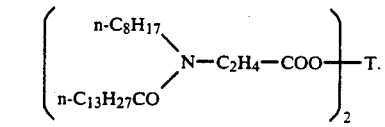

Next, the resulting mass converted to a powder with a sample mill (manufactured by Kyoritsu Rika Co.) to a grain size of from 0.01 to 0.01 mm, whereupon the amount of Isopar G in the resulting powder decreased to 1% by weight. A part of the powder was tabletted with a tabletting machine into tablets, each having a diameter of 3 mm.

3 g of each of the powder and the tablets was added to one liter of Isopar G. As a result, both forms were well dispersed in the solvent to provide liquid developing agents comprising negative polarity grains. Each of the liquid developing agents was employed in a Panacopy KV-3000 (manufactured by Matsushita Electric Co.) system, whereupon excellent images were formed with a high resolving power and a high tone reproducibility.

TABLE 6

|  | Self-Dispersibility | Polarity | Grain Size | Image Quality |
|---|---|---|---|---|
| Powder | Self-dispersed in about 3 hours. | negative | 0.30 micron | good |
| Tablets | Self-dispersed after being left in solvent overnight. | negative | 0.29 micron | good |

The charge-adjusting agent-containing self-dispersing colorant obtained above was combined with a carrier liquid to obtain a self-dispersing toner kit.

The colorant powder obtained was added to used developer employed above-described Panacopy KV-3000 system in an amount of 0.3 g per 100 ml of the developer, whereupon the powder self-dispersed in several hours. The developer to which the powder had been added was then used for development. The image density of the images obtained increased from 0.3 to 1.5. Accordingly, it can be seen that the colorant powder is effective as a toner supply.

Additionally, the liquid developing agent obtained above had a good fixing properties. When it was used for development with Cassette File 7000R (electronic file, manufactured by Fuji Photo Film Co.), a good image-fixing property was displayed.

After the liquid developing agent obtained was allowed to stand for a while, the toner grains hardly precipitated. The stored agent still had an excellent re-dispersibility. Precisely, the agent stored for 3 months under ambient conditions was easily re-dispersed merely by shaking the container containing the agent.

EXAMPLE 16

The following components were melt-kneaded with a three-roll mill at 110° C. for 30 minutes.

| Graft-Copolymer (2) | 4 parts |
|---|---|
| Carbon Black #30 (manufactured by Mitsubishi Kasei Corp.) | 1 part |
| Dispersing Agent (described below) | 1 part |

The kneaded blend was then converted into a powder with a sample mill to obtain a powder having a grain size of from 0.3 to 0.01 mm. Another kit was prepared using this powder. The Isopar G used contained the same charge-adjusting agent as used in Example 15, in an amount of $1 \times 10^{-4}$ M/liter. When 3 g of the powder was added to the charge-adjusting agent-containing Isopar G, it was completely self-dispersed within about 30 minutes to produce a negative polarity liquid developing agent. Development was effected using this liquid developing agent in the same manner as in Example 15. Good images were formed with an excellent image-reproducibility.

DISPERSING AGENT

A graft-copolymer of styrene macromonomer AS-6 and stearyl acrylate (10/90) was dissolved in Isopar G, which was used as a dispersing agent.

EXAMPLE 17

The following components were kneaded with a three-roll mill 2 hours at 80° C.

| Graft-Copolymer (7) | 5 parts |
|---|---|
| Carbon Black #30 | 1 part |
| Nigrosine (Bontron N-01 manufactured by Orient Chemical Co.) | 0.2 part |
| Zirconium Naphthenate | 0.01 part |
| Isopar G | 1 part |

The kneaded blend was then converted into a powder with a sample mill to obtain a powder having a grain size of from 0.1 to 0.01 mm. 3 g of the powder was combined with one liter of Isopar G to prepare a toner kit.

When the powder was added to Isopar G, it was self-dispersed in about 3 hours to produce a positive polarity liquid developing agent.

Using the liquid developing agent thus prepared, the following photoreceptor for a printing plate, which had been positively charged and then imagewise exposed, was processed for reversal development using a conventional method. A good image was formed.

PREPARATION OF PRINTING PLATE PRECURSOR

The surface of a JIS 1050 aluminium sheet was sand-finished with a rotary nylon brush, using a pamis-water suspension as a polishing agent. The surface roughness (center line mean roughness) of the finished surface was 0.5 micron. After washing with water, the sheet was then dipped in an aqueous 10%-sodium hydroxide solution at 70° C. for etching, whereupon the amount of the dissolved aluminium was 6 g/m². After again washing with water, this sheet was dipped in an aqueous 30%-nitric acid solution for neutralization, and then this sheet was further washed with water sufficiently. Afterwards, the sheet was electrolyzed for surface-roughening in an aqueous 0.7%-nitric acid solution for 20 seconds, using alternate square waves having an anode voltage of 13 V and a cathode voltage of 6 V (see JP-B-55-19191, for example), and then this was dipped in a 20% sulfuric acid of 50° C. to wash the surface thereof. Next, this so treated sheet was washed with water. Further, this sheet was subjected to anodic oxidation in an aqueous 20% sulfuric acid solution to form an anodic oxidation film of 3.0 g/m². Last, this sheet was washed with water and dried, and a printing plate precursor was obtained.

Next, a photoconductive layer-coating composition comprising the following components was coated on the printing plate precursor with a bar coater and dried at 120° C. for 10 minutes.

| Photoconductive Layer-Coating Composition: | |
|---|---|
| 1. Hydrazone Compound | 2.5 parts |

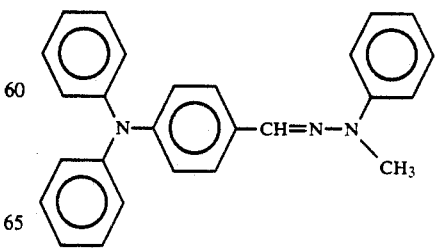

| 2. Copolymer of Benzyl Methacrylate and Methacrylic Acid (methacrylic acid | 75 parts |

-continued

Photoconductive Layer-Coating Composition:

content: 40 mol %)

| | |
|---|---|
| 3. Thiopyrylium Salt Compound | 1.18 parts |

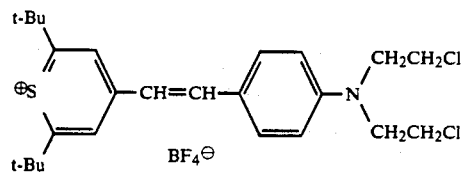

| | |
|---|---|
| 4. Methylene Chloride | 510 parts |
| 5. Methyl Cellosolve Acetate | 150 parts |

The dry film thickness on the printing plate precursor thus prepared was 4 microns.

EXAMPLE 18

A solution was prepared from the following components.

| | | |
|---|---|---|
| Graft-Copolymer (3) | 10 parts | |
| Nigrosine (Bontron N-01) | 1 parts | |
| Dichloromethane | 100 parts | |

The solvent was evaporated from the resulting solution to obtain a color powder. The color powder was added to Isopar G, whereupon this self-dispersed therein to produce dispersed grains having a grain size of 0.15 micron. The grains had a positive polarity. 2 g of the color powder was added to one liter of Isopar G to obtain a dispersion. A zinc oxide-coated photoreceptor of the ELP Master II Type (marketed by Fuji Photo Film Co.) was corona-charged to −700 V in the dark and then imagewise exposed. The thus exposed photoreceptor was then developed with the dispersion prepared above, whereupon an image with some image flow was obtained.

EXAMPLE 19

2 g of the color powder as obtained in Example 18 was added to one liter of Isopar G containing $1 \times 10^{-6}$ M zirconium naphthenate to obtain a self-dispersing dispersion. The dispersed grains in the dispersion had a grain size of 0.5 micron, the dispersion had a positive polarity. This was used for development in the same way as in Example 18 and, as a result, an image with no image flow was formed with excellent resolving power. The combination comprising the color powder and the zirconium naphthenate-containing Isopar G is a toner kit comprising a toner and a carrier liquid.

As discribed above, in accordance with the present invention a toner and a colorant which are usable in preparing a liquid developing agent for electrostatic photography, a printing ink, and an ink for ink-jet system or a coating paint ink can be produced without any necessity for mechanical dispersion. Accordingly, a solid toner supply for a liquid developing agent for electrophotography as well as a toner kit which does not require mechanical dispersion before use is provided by the present invention.

While the invention has been described in detail and with reference to specific embodiments thereof, it will be apparent to one skilled in the art that various changes and modifications can be made therein without departing from the spirit and scope thereof.

What is claimed is:

1. A liquid developing agent for electrostatic photography, which comprises toner grains at least containing a resin, dispersed in a high-electrical insulating carrier liquid, wherein the resin is a self-dispersing graft-copolymer capable of self-dispersing in the carrier liquid to form said toner grains, wherein the self-dispersing graft-copolymer is formed from a macromonomer having a polymerizable functional group at its terminal and a comonomer, wherein said macromonomer is formed from one of (a) a monomer forming moiety which is insoluble in the carrier liquid or (b) a monomer forming moiety which is soluble in the carrier liquid, and said comonomer is formed from the other of the monomer forming moiety (a) or (b), the insoluble monomer forming moiety is represented by formula (1):

$$CH_2=C\begin{matrix}R_1\\|\\|\\R_2\end{matrix} \quad (1)$$

wherein $R_1$ represents a hydrogen atom or a methyl group;
$R_2$ represents —COOR$_3$, —O—COR$_3$,

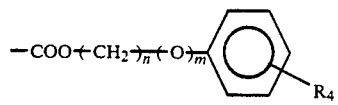

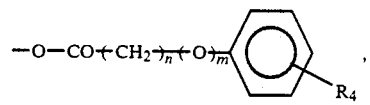

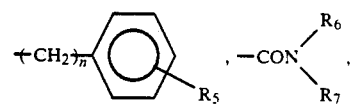

or —CN;

$R_3$ represents a substituted or unsubstituted alkyl group having from 1 to 3 carbon atoms, a cycloalkyl group having from 3 to 8 carbon atoms, or a residue or a crosslinked hydrocarbon compound having 4 to 18 carbon atoms;

$R_4$ represents a hydrogen atom, an alkyl group having from 1 to 4 carbon atoms, a halogen atom, a nitro group, a cyano group or a phenyl group, with the number of $R_4$'s being from 1 to 3;

$R_5$ represents a hydrogen atom, a methyl group, an ethyl group, a halogen atom, a nitro group, a cyano group or a hydroxyl group, with the number of $R_5$'s being from 1 to 3; and $R_6$ and $R_7$, which may be the same or different, each represents an alkyl group having from 1 to 4; and the soluble monomer forming moiety is represented by formula (2):

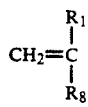  (2)

wherein

R₁ represents a hydrogen atom or a methyl group;
R₈ represent —COOR₉, —O—COR₉, —OR₉,

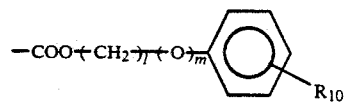,

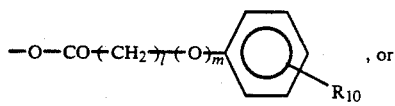, or

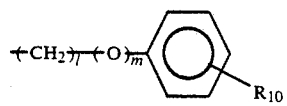;

R₉ represents a linear or branched, substituted or unsubstituted, alkyl group having from 6 to 22 carbon atoms;

R₁₀ represents a linear or branched, substituted or unsubstituted, alkyl group having from 4 to 12 carbon atoms; and l represents from 0 to 6; and m represents 0 or 1.

2. A solid toner for supply to a liquid developing agent for electrostatic photography, which comprises toner grains at least containing a resin dispersed in a high-electrical insulating carrier liquid, where the toner comprises a self-dispersing graft-copolymer capable of self-dispersion in a high-electrical insulating carrier liquid to form said toner grains, or a self-dispersing solid colorant containing at least one of a pigment, a dye, a charge-adjusting agent and a dispersion stabilizer in the graft-copolymer.

3. The solid toner for supply to a liquid developing agent for electrostatic photography as in claim 2, in which the self-dispersing graft-copolymer comprises monomer forming moieties which are insoluble in the carrier liquid and monomer forming moieties which are soluble in the carrier liquid.

4. The solid toner for supply to a liquid developing agent for electrostatic photography as in claim 3, in which the self-dispersing graft-copolymer is formed from a macromonomer having a polymerizable functional group at its terminal.

5. The solid toner for supply to a liquid developing agent for electrostatic photography as in claim 3, in which the insoluble monomers are those of the general formula (1):

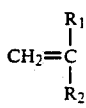  (1)

wherein

R₁ represents a hydrogen atom or a methyl group;
R₂ represents —COOR₃, —O—COR₃,

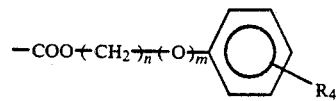,

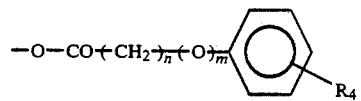,

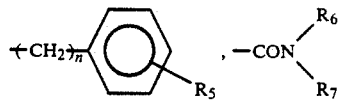

or CN;

R₃ represents a substituted or unsubstituted alkyl group having from 1 to 3 carbon atoms, a cycloalkyl group having from 3 to 8 carbon atoms, or a residue of a crosslinked hydrocarbon compound having 4 to 18 carbon atoms;

R₄ represents a hydrogen atom, an alkyl group having from 1 to 4 carbon atoms, a halogen atom, a nitro group, a cyano group or a phenyl group, with the number of R₄'s being from 1 to 3;

n is 0 to 2 and m is 0 or 1;

R₅ represents a hydrogen atom, a methyl group, an ethyl group, a halogen atom, a nitro group, a cyano group or a hydroxyl group, the number of R₅'s being from 1 to 3; and R₆ and R₇, which may be the same or different, each represents an alkyl group having from 1 to 4.

6. A toner kit for a liquid developing agent for electrostatic photography, comprising a self-dispersing solid graft-copolymer capable of self-dispersion in a high-electrical insulating carrier liquid to form grains therein or a self-dispersing solid colorant containing at least one of a pigment, a dye, a charge-adjusting agent and a dispersion stabilizer in the graft-copolymer, and a high-electrical insulating carrier liquid or a high-electrical insulating carrier liquid composition containing at least one of a charge-adjusting agent and a dispersion stabilizer.

7. The solid toner for supply to a liquid developing agent for electrostatic photography as in claim 6, in which the soluble monomers are those of the general formula (2):

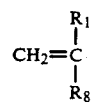  (2)

wherein R₁ represents a hydrogen atom or a methyl group; R₈ represents —COOR₉, —O—COR₉, —OR₉,

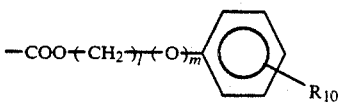,

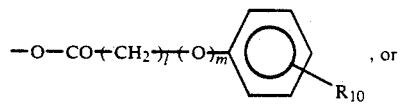, or

-continued

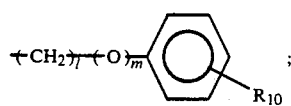

R$_9$ represents a linear or branched substituted or unsubstituted alkyl group having from 6 to 22 carbon atoms;

R$_{10}$ represents a linear or branched substituted or unsubstituted alkyl group having from 4 to 12 carbon atoms; and l represents from 0 to 6; and m represents 0 or 1.

8. The toner kit for a liquid developing agent for electrostatic photography s in claim 6, in which the self dispersing graft-copolymer is formed from a macromonomer having a polyfunctional group at its terminal.

9. The toner kit for a liquid developing agent for electrostatic photography as in claim 6, in which the self dispersing graft-copolymer comprises monomer forming moieties which are insoluble in the carrier liquid and monomer forming moieties which are soluble in the carrier liquid.

10. The toner kit for a liquid developing agent for electrostatic photography as in claim 9, in which the insoluble monomers are those of the general formula (1):

$$CH_2=\overset{R_1}{\underset{R_2}{C}} \qquad (1)$$

wherein
R$_1$ represents a hydrogen atom or a methyl group;
R$_2$ represents —COOR$_3$, —O—COR$_3$,

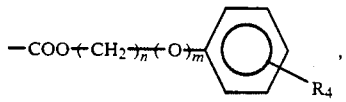

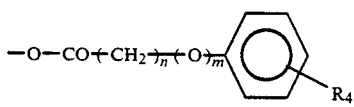

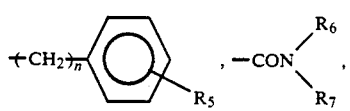

or CN; R$_3$ represents a substituted or unsubstituted alkyl group having from 1 to 3 carbon atoms, a cycloalkyl group having from 3 to 8 carbon atoms, or a residue of a crosslinked hydrocarbon compound having 4 to 18 carbon atoms;

R$_4$ represents a hydrogen atom, an alkyl group having from 1 to 4 carbon atoms, a halogen atom, a nitro group, a cyano group or a phenyl group, with the number of R$_4$'s being from 1 to 3;

n is from 0 to 2 and m is 0 or 1;

R$_5$ represents a hydrogen atom, a methyl group, an ethyl group, a halogen atom, a nitro group, a cyano group or a hydroxyl group, with the number of R$_5$'s being from 1 to 3; and R$_6$ and R$_7$, which may be the same or different, each represents an alkyl group having from 1 to 4.

11. The toner kit for a liquid developing agent for electrostatic photography as in claim 9, in which the soluble monomers are those of the general formula (2):

$$CH_2=\overset{R_1}{\underset{R_8}{C}} \qquad (2)$$

wherein
R$_1$ represents a hydrogen atom or a methyl group;
R$_8$ represents —COOR$_9$, —O—COR$_9$, —OR$_9$,

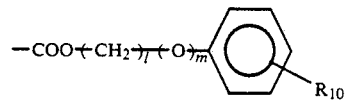, or

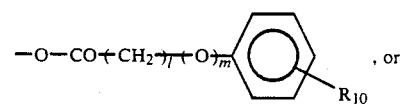

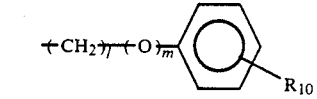

R$_9$ represents a linear or branched substituted or unsubstituted alkyl group having from 6 to 22 carbon atoms;

R$_{10}$ represents a linear or branched substituted or unsubstituted alkyl group having from 4 to 12 carbon atoms; and l represents from 0 to 6; and m represents 0 or 1.

12. The liquid developing agent for electrostatic photography as in claim 1, wherein the amount of macromonomer is 50 wt % or more of the graft-copolymer.

* * * * *